3,416,997
Patented Dec. 17, 1968

3,416,997
PROCESS FOR PURIFICATION OF FUNGAL ALPHA AMYLASE
Richard Russell Barton, Elkhart, Ind., assignor to Miles Laboratories, Inc., Elkhart, Ind., a corporation of Indiana
No Drawing. Filed Nov. 1, 1965, Ser. No. 506,011
3 Claims. (Cl. 195—66)

ABSTRACT OF THE DISCLOSURE

Fungal alpha amylase containing impurities, such as amyloglucosidase, protease and non-enzymatic proteins, can be purified by contacting a weakly-basic anionic ion-exchange material with a solution of fungal alpha amylase containing impurities to selectively adsorb the impurities by the anionic ion-exchange material without adsorbing any appreciable amount of fungal alpha amylase.

---

This invention relates to a process for the purification of fungal alpha amylase. More particularly, it relates to the use of an anionic ion-exchange material to selectively remove impurities, such as anyloglucosidase, from fungal alpha amylase.

Fungal alpha amylase, also known as alpha 1,4-glucan 4-glucanohydrolase, is a well known material which catalyzes the hydrolysis of starch to aid in starch liquefaction and in the saccharification of starch to form maltose.

Fungal alpha amylase is known to be prepared by fermentation processes employing certain strains of fungi belonging to the Aspergillus species and certain strains of Rhizopus species. Illustrative fungi are those of the species *Aspergillus oryzae, Aspergillus niger, Aspergillus phoenicis, Rhizopus delemar* and the like.

The fungal strains producing fungal alpha amylase are also known to produce other enzymes, such as amyloglucosidase. Amyloglucosidase is known to promote the formation of dextrose directly from starch and should be removed from fungal alpha amylase prior to starch saccharification when it is desired to improve the overall maltose production and decrease overall dextrose production in a given process.

It is therefore a principal object of the present invention to provide a process for removing impurities, such as amyloglucosidase, from fungal alpha amylase.

In accordance with the present invention, a weakly-basic anionic ion-exchange material is contacted with a fungal alpha amylase solution containing amyloglucosidase impurity to selectively adsorb the amyloglucosidase impurity by the anionic ion-exchange material without adsorbing any appreciable amount of fungal alpha amylase. This is conveniently carried out by the simple process of flowing an aqueous solution of fungal alpha amylase containing an amyloglucosidase impurity through a bed of weakly-basic anionic ion-exchange material and withdrawing the so purified fungal alpha amylase from the bed. The amyloglucosidase, along with other impurities, such as proteases and non-enzymatic proteins, remains behind in the bed. Alternatively, the weakly-basic anionic ion-exchange material can be introduced to a fungal alpha amylase solution, allowed to remain until the impurities are adsorbed and then the anionic ion-exchange material containing the impurities can be separated, if desired, from the fungal alpha amylase. This process removes substantially all of the amyloglucosidase from fungal alpha amylase with minimum loss of fungal alpha amylase.

The process of the present invention is useful for purifying fungal alpha amylase in various forms. It can be in the form of aqueous whole cultures and fermentation beers known in the art. It can also be in the form of dried material which is then dissolved in aqueous media for use in the present process. The concentration of fungal alpha amylase in the aqueous solution is not critical. As is known in the art, dilute solutions will require large quantities of liquid material to be processed in order to purify a given quantity of fungal alpha amylase. The more concentrated solutions will enable a given quantity of fungal alpha amylase to be purified with less effort and in a shorter period of time.

The anionic ion-exchange materials useful in the present invention are well known and are available from several sources. Typical anionic ion-exchange materials and their preparation are described, for example, in U.S. Patent No. 2,366,008 of G. F. D'Alelio, U.S. Patent No. 2,591,573 of C. H. McBurney, U.S. Patent No. 2,591,574 of C. H. McBurney and U.S. Patent No. 2,681,319 of G. W. Bodamer. Such materials, for example, can consist of polymerized styrene-divinylbenzene containing reactive ion-exchange sites. Other materials, such as phenol-formaldehyde resins, polystyrene, coal derivatives, cellulose and the like which contain the proper reactive sites can also be employed. In the weakly-basic anionic ion-exchange materials the reactive sites are generally primary and secondary amines, such as diethylenetriamino groups and the like. These anionic ion-exchange materials can be either in the base ($OH^-$) form or the salt ($Cl^-$ or $SO_4^=$) form. When the anionic material is at a basic pH, it is in the base form. When it is neutral or at an acid pH, it is in the salt form.

Other ion-exchange materials useful in the present invention are the cellulose ion-exchangers containing anionic reactive sites. Such materials as anionic diethylaminoethyl cellulose (DEAE-Cellulose) and anionic epichlorohydrin-triethanolamine cellulose (ECTEOLA-Cellulose) are well known in the art.

Another ion-exchange material useful in the present invention employs as the substrate a polysaccharide dextran suitably cross-linked with epichlorohydrin to produce a hydrophilic solid gel characterized by a high degree of microporosity. This substrate is available under the trade name "Sephadex" and is marketed by Pharmacia Fine Chemicals, Inc., New York, N.Y. The diethylaminoethyl modified form of this substrate is known as "DEAE-Sephadex," for example.

Weakly-basic anion exchange materials useful in the present invention are sold under the following illustrative trade names by the indicated suppliers:

TABLE I

| Reactive group | Trade name | Supplier |
| --- | --- | --- |
| Polyamine | Duolite A-6 | Diamond Alkali Co. |
| Do | Duolite A-7 | Do. |
| Do | Duolite A-2 | Do. |
| Do | Amberlite IR-45 | Rohm and Haas Co. |
| Do | Amberlite IRA-50 | Do. |
| Do | Permutit A | The Permutit Co. |
| Do | De-Acidite | Do. |
| Do | Dowex 3 | Dow Chemical Co. |
| Do | Nalcite WBR | National Aluminate Corp. |
| Diethylaminoethyl | DEAE-Selectacel (Cellulose). | Carl Schleicher and Schuell Co. |
| Epichlorohydrintriethanolamine. | ECTEOLA-Selectacel (Cellulose). | Do. |

Before contacting the weakly-basic anionic ion-exchange material with the aqueous fungal alpha amylase solution, the anionic material should be conditioned to the proper pH level for proper purification activity. The anionic ion-exchange material should be at a pH in the range of from about 5.0 to about 7.6, preferably from about 5.0 to about 7.0. This condition is conveniently obtained by washing the anionic ion-exchange material with an equeous solution of NaOH having a strength of about 0.25 to 0.5 N, washing with water to a pH of about 8 to 8.5, washing with an aqueous solution of HCl having a strength of about 0.25 to 0.5 N, and finally washing with water to the desired final pH. The desired pH is then maintained by means of an appropriate buffer, such as sodium acetate, sodium citrate or sodium phosphate.

The process conditions for carrying out the ion-exchange purification process of the present invention are not narrowly critical. Temperatures from about 0° C. to about 45° C. can be employed. At temperatures below about 0° C. the fungal alpha amylase aqueous solutions will tend to freeze. At temperatures above about 45° C. the fungal alpha amylase will tend to be inactivated. Preferably, temperatures of about 20° C. to about 30° C. are employed. Atmospheric pressure conditions are preferably employed but pressures above and below atmospheric can be used if desired with no material advantages or disadvantages. The contact time between the enzyme solution and the anionic ion-exchange material is not critical in this process.

In carrying out the process of this invention, the aqueous enzyme solution is conveniently passed through a bed of the anionic ion-exchange material. For every volume of enzyme solution passed into the bed, about 0.2 volume of water were thereafter passed through the bed to insure substantially complete removal of fungal alpha amylase from the bed.

The purified aqueous enzyme solutions obtained from the above ion-exchange purification process can be used directly in subsequent processes. Preferably, however, the fungal alpha amylase is isolated in further purified form from the ion-exchange effluent. Such isolation employs well known precipitation techniques, such as ethanol precipitation, followed by drying of the resulting enzyme precipitates according to well known methods.

As the anionic ion-exchange material purifies fungal alpha amylase, it becomes loaded with impurities, such as amyloglucosidase, and the number of useful reactive sites decreases. It must then be regenerated for further use. The anionic ion-exchange materials useful in the present invention can be regenerated by the procedure described above for initially adjusting the pH. These steps are washing with NaOH, washing with water, washing with HCl and finally washing with water. When the anionic ion-exchange materials are properly regenerated, as is well known in the art, they can be reused indefinitely since they are not consumed during the process of removing the amyloglucosidase impurity from the fungal alpha amylase.

The capacity of anionic ion-exchange materials for removal of impurities from fungal alpha amylase will vary for each particular material. This capacity can be experimentally determined for each material by methods well known in the art.

The process of the present invention removes amyloglucosidase from fungal alpha amylase with minimum loss of fungal alpha amylase. Methods are provided for determining fungal alpha amylase content (defined in terms of activity units per gram) of starting material and purified material to measure fungal alpha amylase recovery. Amyloglucosidase removal is determined by comparing the amyloglucosidase activity of the starting material and the purified material. Amyloglucosidase activity is expressed in terms of activity units per gram. The purified fungal alpha amylase produced by this process has a relatively high alpha amylase activity with respect to amyloglucosidase activity. This relatively high activity can be expressed as having an alpha amylase:amyloglucosidase activity ratio of greater than about 1500.

These determination methods are described below:

Fungal alpha amylase activity.—An alpha amylase unit is the enzyme activity indicated when, in the presence of an excess of beta amylase, 1 gram of alpha amylase will catalyze the hydrolysis of 1 gram of starch to dextrin in 1 hour under standard assay conditions. The standard assay conditions are 20 ml. of an aqueous substrate containing 0.4 gram of soluble starch and 0.01 gram of beta amylase; pH 5.0; 30° C.; 10 ml. of an alpha amylase solution of sufficient potency that it will catalyze the dextrinization of starch in about 8 to 20 minutes; and incubation time sufficient to achieve dextrin formation. Dextrin formation is determined when the enzyme-starch solution produces a desired standard color when contacted with iodine. The number of alpha amylase units are calculated by the following formula:

$$\text{Alpha amylase units} = \frac{0.4 \times 60}{\text{Weight enzyme (gram)} \times \text{dextrinization time (minutes)}}$$

Amyloglucosidase activity.—An amyloglucosidase unit is the amount of enzyme that will catalyze the production of 1 gram of reducing sugar expressed as dextrose in 1 hour under standard assay conditions. The standard assay conditions are 2 grams of soluble starch in a 4 weight percent aqueous solution; pH 4.2; 60° C.; 1 hour incubation; enzyme material to be tested adjusted to such a concentration that it will catalyze about 20 to 30 weight percent of the soluble starch during the 1 hour period. The dextrose content of the enzyme converted starch is then determined by the well known Schoorl method.

The present invention will be further described in the following illustrative examples.

Example 1

An ion-exchange column of Duolite A–2 weakly-basic anionic ion-exchange material was adjusted to a pH of 7.0 by passing a 0.1 M sodium acetate solution having a pH of 7.5 through the column. Duolite A–2 is a polymeric phenolic secondary amine composition having chloride and sulfate anionic reactive sites, and it is marketed by the Diamond Alkali Company. A quantity of liquid aqueous fungal alpha amylase obtained from the fermentation of Aspergillus oryzae was adjusted to a pH of 6.5 with 0.5 N NaOH. The pH-adjusted aqueous fungal alpha amylase was then passed through the bed of anionic ion-exchange material in an amount of 2 volumes of aqueous fungal alpha amylase for each volume of the ion-exchange material. For each volume of aqueous fungal alpha amylase passed into the column, 0.2 volumes of water were thereafter passed through the column to insure removal of amylase activity from the column. The total aqueous enzyme solution passed through the column contained 89.9 percent of the total amylase activity present in the starting material and represented minimum loss of amylase activity during the ion-exchange purification process. The starting material contained fungal alpha amylase and amyloglucosidase at activity levels such that the alpha amylase:amyloglucosidase activity ratio was 795. The ion-exchange treated material contained fungal alpha amylase and amyloglucosidase at activity levels such that the alpha amylase:amyloglucosidase activity ratio was 1915. The above data clearly indicates a removal of amyloglucosidase from fungal alpha amylase by the novel process of this invention.

Example 2

An ion-exchange column of Duolite A–7 weakly-basic anionic ion-exchange material was adjusted to a pH of 5.0 by passing a 0.05 M sodium phosphate solution through the column. Duolite A–7 is a polymeric phenolic secondary amine composition having chloride and sulfate anionic reactive sites, and it is marketed by the Diamond Alkali Company. A quantity of liquid aqueous fungal alpha amylase obtained from the fermentation of Aspergillus oryzae was passed through the column of anionic ion-exchange material in an amount of 2 volumes of aqueous fungal alpha amylase for each volume of the ion-exchange material. For each volume of aqueous fungal alpha amylase passed into the column, 0.2 volume of water were thereafter passed through the column. The total aqueous enzyme solution passed through the column contained 77 percent of the total amylase activity present in the starting material. The starting material contained fungal alpha amylase and amyloglucosidase at activity levels such that the alpha amylase:amyloglucosidase activity ratio was 795. The ion-exchange treated material contained fungal alpha amylase and amyloglucosidase at activity levels such that the alpha amylase:amyloglucosidase activity ratio was 2050. The above data clearly indicate a removal of amyloglucosidase from fungal alpha amylase by the novel process of the invention.

Example 3

A run similar to that described in Example 2 was repeated wherein the starting enzyme solution and the ion-exchange solution were assayed for alpha amylase and protease activities. The starting material had an alpha amylase activity of 70,588 units and a protease activity of 2078 units. The ion-exchanged material had an alpha amylase activity of 60,000 units and a protease activity of 749 units. These data indicate a recovery of 85 percent of the alpha amylase activity while removing 64 percent of the protease activity through ion-exchange treatment. Protease activity is expressed in hemoglobin units. A hemoglobin unit is related to the amount of nitrogen produced by enzyme action on a standardized amount of hemoglobin. The enzyme activity is measured colorimetrically on a solution prepared by treating hemoglobin with the enzyme at pH 4.7 for 30 minutes at 40° C. The colorimetric procedure is standardized against samples of known protease activity.

The purified fungal alpha amylase obtained through the process of the present invention is useful for liquefying starch and for saccharifying starch in the production of sugar syrups. Utility for this product is shown in the following example.

Example 4

An aqueous suspension of solubilized starch having a concentration of 30 percent solids (weight/volume basis) and having been acid-thinned with hydrochloric acid to a Dextrose Equivalent of 19 was adjusted to a pH of 5.3 and heated to 55° C. Fungal alpha amylase purified in accordance with the technique of Example 1 above was added to the acid-thinned starch in an amount of 4160 amylase units per 1000 g. of acid-thinned starch. The mixture was incubated at 55° C. for 48 hours. The resulting syrup had a Dextrose Equivalent of 36.26, contained over 50 weight percent of the dissolved solids as maltose and contained 4.81 weight percent of the dissolved solids as dextrose. This syrup is useful as a sweetening agent in baking.

In summary, the present invention relates to a process for passing an aqueous fungal alpha amylase solution through a bed of weakly-basic anionic ion-exchange material to remove impurities, such as amyloglucosidase and protease, from the amylase with minimum loss of the amylase.

What is claimed is:

1. A process for the purification of fungal alpha amylase which comprises contacting a weakly-basic anionic ion-exchange material with a solution of fungal alpha amylase obtained from *aspergillus oryzae* and containing impurities consisting of amyloglucosidase, protease and non-enzymatic proteins to selectively adsorb the impurities by the anionic ion-exchange material without adsorbing any appreciable amount of fungal alpha amylase.

2. A process for the purification of fungal alpha amylase in accordance with claim 1 which comprises contacting an aqueous solution of fungal alpha amylase obtained from *Aspergillus oryzae* and containing an amyloglucosidase impurity with a weakly-basic anionic ion-exchange material whereby the amyloglucosidase impurity is selectively removed from the solution by the anionic ion-exchange material with minimum removal of fungal alpha amylase, and then separating the so-purified aqueous solution of fungal alpha amylase from the anionic ion-exchange material containing the amyloglucosidase impurity.

3. A process according to claim 1 wherein the impurity being removed is protease.

References Cited

UNITED STATES PATENTS

| 3,249,512 | 5/1966 | Bode | 195—31 X |
| 3,254,003 | 5/1966 | Croxall | 195—66 |
| 3,335,066 | 8/1967 | Corman | 195—31 |

OTHER REFERENCES

Pazur, J. H., et al.: Journal of Biological Chemistry, vol. 234, No. 8, pp. 1966–1970, August 1959.

LIONEL M. SHAPIRO, *Primary Examiner.*